United States Patent
Cherian et al.

(10) Patent No.: US 9,338,682 B2
(45) Date of Patent: May 10, 2016

(54) SYSTEM, METHOD, AND DEVICE FOR MINIMIZING UPLINK REGISTRATION OR LOCATION REPORTS FOR FIXED OR LOW-MOBILITY DEVICES

(71) Applicant: TELEFONAKTIEBOLAGET L M ERICSSON (PUBL), Stockholm (SE)

(72) Inventors: Airin Cherian, Dallas, TX (US); Ke-Chi Jang, Plano, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 27 days.

(21) Appl. No.: 14/031,329

(22) Filed: Sep. 19, 2013

(65) Prior Publication Data

US 2014/0087717 A1     Mar. 27, 2014

Related U.S. Application Data

(60) Provisional application No. 61/703,854, filed on Sep. 21, 2012.

(51) Int. Cl.
*H04W 24/10* (2009.01)
*H04W 60/02* (2009.01)

(52) U.S. Cl.
CPC .............. *H04W 24/10* (2013.01); *H04W 60/02* (2013.01)

(58) Field of Classification Search
CPC . H04W 36/0066; H04W 76/04; H04W 88/06; H04W 36/30; H04W 36/14; H04W 40/22; H04W 24/10; H04W 36/06; H04W 40/248; H04W 60/02; H04L 1/0002; H04L 1/0026
See application file for complete search history.

(56) References Cited

U.S. PATENT DOCUMENTS

| 8,744,437 B2 * | 6/2014 | Zhu ........................ H04W 60/00 370/328 |
| 8,755,766 B2 * | 6/2014 | Liao ....................... H04W 28/02 455/404.2 |
| 8,838,806 B2 * | 9/2014 | Lu ......................... H04W 76/021 709/227 |
| 8,914,049 B2 * | 12/2014 | Nair .................... H04L 12/1403 455/458 |

(Continued)

FOREIGN PATENT DOCUMENTS

EP      2 464 180 A1     6/2012

OTHER PUBLICATIONS

3GPP. 3rd Generation Partnership Project; Technical Specification Group Core Network and Terminals; Mobile Radio interface Layer 3 specification; Core network protocols; Stage 3 (Release 11). 3GPP TS 24.008 v11.3.0 (Jun. 2012), Jun. 25, 2012.

(Continued)

*Primary Examiner* — Liton Miah

(57) ABSTRACT

A system, method, and device for minimizing uplink registration or location reports, such as route update messages, for fixed or low-mobility devices. An access terminal is configured to transmit route update messages to a radio access network at a first rate and also at a reduced rate that is lower than the first rate. The access terminal is configured to transmit to the radio access network a request to allow the access terminal to use a reduced reporting function that causes the access terminal to transmit route update messages at a reduced rate that is lower than the first rate, receive a response that grants permission to use the reduced reporting function, and transmit route update messages at the reduced rate in accordance with the reduced reporting function.

22 Claims, 6 Drawing Sheets

(56) References Cited

U.S. PATENT DOCUMENTS

| | | | | |
|---|---|---|---|---|
| 8,918,090 | B2* | 12/2014 | Liao | H04W 60/02 |
| | | | | 455/418 |
| 9,008,647 | B2* | 4/2015 | Bienas | H04W 8/22 |
| | | | | 455/422.1 |
| 9,088,976 | B2* | 7/2015 | Islam | H04W 76/022 |
| 2005/0119008 | A1 | 6/2005 | Haumont | |
| 2006/0031519 | A1* | 2/2006 | Helliwell et al. | 709/227 |
| 2011/0170410 | A1* | 7/2011 | Zhao et al. | 370/232 |
| 2012/0039313 | A1 | 2/2012 | Jain | |

OTHER PUBLICATIONS

3GPP. 3rd Generation Partnership Project; Technical Specification Group Core Network and Terminals; NonAccess-Stratum (NAS) protocol for Evolved Packet System (EPS); Stage 3 (Release 11). 3GPP TS 24.301 v11.4.0 (Sep. 2012), Sep. 19, 2012.

3GPP 3rd Generation Partnership Project; Technical Specification Group Services and System Aspects; General Packet Radio Service (GPRS); Service description; Stage 2 (Release 11). 3GPP TS 23.060 v11.3.0 (Sep. 2012), Sep. 11, 2012.

3GPP. $3^{rd}$ Generation Partnership Project; Technical Specification Group Services and System Aspects; General Packet Radio Service (GPRS) enhancements for Evolved Universal Terrestrial Radio Access Network (E-UTRAN) access (Release 11). 3GPP TS 23.401 v11.3.0, Sep. 11, 2012.

3rd Generation Partnership Project; Technical Specification Group Services and System Aspects; System improvements for Machine-Type Communications (MTC) (Release 11). 3GPP Standard; 3GPP TR 23.888 No. v11 .0.0, 3rd Generation Partnership Project (3GPP), Mobile Competence Centre ; 650, Route des Lucioles ; F-06921; Sophia-Antipolis Cedex; France, vol. SA WG2, No. V11 .0.0, Sep. 18, 2012.

* cited by examiner

SYSTEM, METHOD, AND DEVICE FOR MINIMIZING UPLINK REGISTRATION OR LOCATION REPORTS FOR FIXED OR LOW-MOBILITY DEVICES

CROSS-REFERENCE TO RELATED APPLICATIONS

This Non-Provisional United States patent application claims the priority benefit of U.S. Provisional Application Ser. No. 61/703,854, filed on Sep. 21, 2012, which is hereby incorporated by reference herein in its entirety including all references cited therein.

TECHNICAL FIELD

The disclosure relates generally to wireless communications systems, and more specifically, but not by way of limitation, to a system, method, and device for reducing or minimizing uplink registration or location reports for fixed or low-mobility devices. Advantageously, the present technology can be used in wireless networks to improve network performance in response to reduced use of uplink registration or location reports by fixed or low-mobility devices.

BACKGROUND

For current HRPD networks, Access Terminals (AT) in an idle state on the network are required to send a RouteUpdate (location) message with every access channel capsule transmitted by the AT to a radio access network (RAN). A RouteUpdate message provides the RAN with updated pilot/channel measurement information. This information is useful especially in networks that include for mobile ATs, where the location of such devices is variable due to their mobility. With the information provided by the AT, the RAN can assign a preferred set of channel specifications for the AT, when traffic channel assignment is required.

These channel assignment methods are useful for ATs that are mobile in nature, since radio conditions local to the AT may change as the AT moves from location to location. In contrast, fixed location devices (or low mobility devices) or fixed location wireless modules are useful for many applications or services. For example, smart meters can be equipped with a wireless module which periodically reports information back to a service provider. This type of application often requires deploying large number of wireless modules in a given area. With multiple such applications, the number of wireless devices (both the fixed wireless modules for these applications and the traditional mobile devices such as cell phones or smart phones) in a given area may increase exponentially. All the devices, whether fixed or mobile, are required to include measurement report when sending a reverse link data or message or have measurement report periodically based on the mobile device requirement.

SUMMARY

The present technology includes fixed or low-mobility devices that are configured to transmit uplink registration or location reports, also referred to as report update messages, in a reduced or minimized manner. Correspondingly, the present technology includes RANs that are capable of allowing fixed or low-mobility devices to transmit report update messages in a reduced or minimized manner. The methods for transmitting report update messages in a reduced or minimized manner will hereinafter be referred to as "reduced reporting functions".

In one embodiment, the present technology is directed to a method, in an access terminal, for reducing a first rate at which the access terminal transmits route update messages (for example, location update related messages or measurement report messages) to a radio access network over a wireless link. In some embodiments the access terminal includes a processor and a memory for storing logic. The logic is executed by the processor to perform the method that includes transmitting to the radio access network a request to allow the access terminal to use a reduced reporting function that causes the access terminal to transmit route update messages at a reduced rate that is lower than the first rate. In one embodiment the method includes receiving from the radio access network a response that grants permission to use the reduced reporting function by the access terminal. Also, the method includes transmitting route update messages to the radio access network at the reduced rate in accordance with the reduced reporting function.

In one embodiment, the reduced reporting function comprises a timer parameter or a counter parameter, either of which define the reduced rate.

In one embodiment, the reduced reporting function includes the timer parameter. Further, the method includes transmitting an initial route update message to the radio access network and resetting a timer within the access terminal. It will be understood that timer counts a time period between transmissions of route update messages to the radio access network.

In one embodiment, the reduced reporting function includes a counter parameter. Further, the method includes transmitting an initial route update message to the radio access network and resetting a counter within the access terminal. The counter parameter includes a counter value that specifies a number of messages that are to be sent by the access terminal before having to transmit a route update message to the radio access network.

In another embodiment, the method includes transmitting a route update message to the radio access network when requested by the radio access network, even when a route update message is not required by the reduced reporting function.

In one embodiment, the method includes the access terminal ascertaining network conditions local to the access terminal via a radio frequency scanner to determine a change in the network conditions local to the access terminal. The method also includes transmitting a route update message to the radio access network even when a route update message is not required by the reduced reporting function, when a change in network conditions local to the access terminal is detected.

According to one embodiment, the present technology is directed to a method in a radio access network, for reducing a first rate at which an access terminal transmits route update messages to the radio access network over a wireless link. The radio access network comprises a processor and a memory for storing logic. The logic is executed by the processor to perform the method that includes receiving a request to allow the access terminal to use a reduced reporting function that causes the access terminal to transmit route update messages at a reduced rate that is lower than the first rate. The method also includes transmitting a response that grants permission to use the reduced reporting function by the access terminal, as well as receiving route update messages from the access terminal at the reduced rate in accordance with the reduced reporting function.

In one embodiment the method comprises determining whether the access terminal supports the reduced reporting function by evaluating a subscription profile for the access terminal prior to transmitting the response to the access terminal that grants permission to use the reduced reporting function by the access terminal.

In one embodiment the method comprises transmitting a response to the access terminal denying use of the reduced reporting function when the radio access network determines that the access terminal is not allowed to utilize the reduced reporting function.

In one embodiment the method comprises establishing a timer parameter of the reduced reporting function by selecting a time period between transmissions of route update messages by the access terminal, wherein the timer parameter defines the reduced rate.

In one embodiment the method comprises establishing a counter parameter of the reduced reporting function by defining a counter value that specifies a number of messages that are to be sent by the access terminal before having to transmit a route update message, wherein the timer parameter defines the reduced rate.

In one embodiment the method comprises setting a tracking area update (TAU) period for the access terminal that includes an extended reporting period. The tracking area update (TAU) period includes the reduced reporting function.

According to one embodiment, the present technology is directed to an access terminal configured to transmit route update messages to a radio access network at a first rate and also at a reduced rate that is lower than the first rate. The access terminal includes a processor and a memory for storing logic. In one embodiment the processor executes the logic to cause the access terminal to transmit to the radio access network a request to allow the access terminal to use a reduced reporting function that causes the access terminal to transmit route update messages at a reduced rate that is lower than the first rate. Also, the processor executes the logic to cause the access terminal to receive from the radio access network a response that grants permission to use the reduced reporting function by the access terminal. Also, the processor executes the logic to cause the access terminal to transmit route update messages to the radio access network at the reduced rate in accordance with the reduced reporting function.

According to one embodiment, the present technology is directed to a radio access network that is configured to receive route update messages from an access terminal at a first rate and also at a reduced rate that is lower than the first rate. In one embodiment the radio access network includes a processor and a memory for storing logic. The processor executes the logic to cause the radio access network to determine if an access terminal coupled with the radio access network supports a reduced reporting function. The processor executes the logic to cause the radio access network to transmit a response that grants permission to use the reduced reporting function by the access terminal. The processor executes the logic to cause the radio access network to receive route update messages from the access terminal at the reduced rate in accordance with the reduced reporting function.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
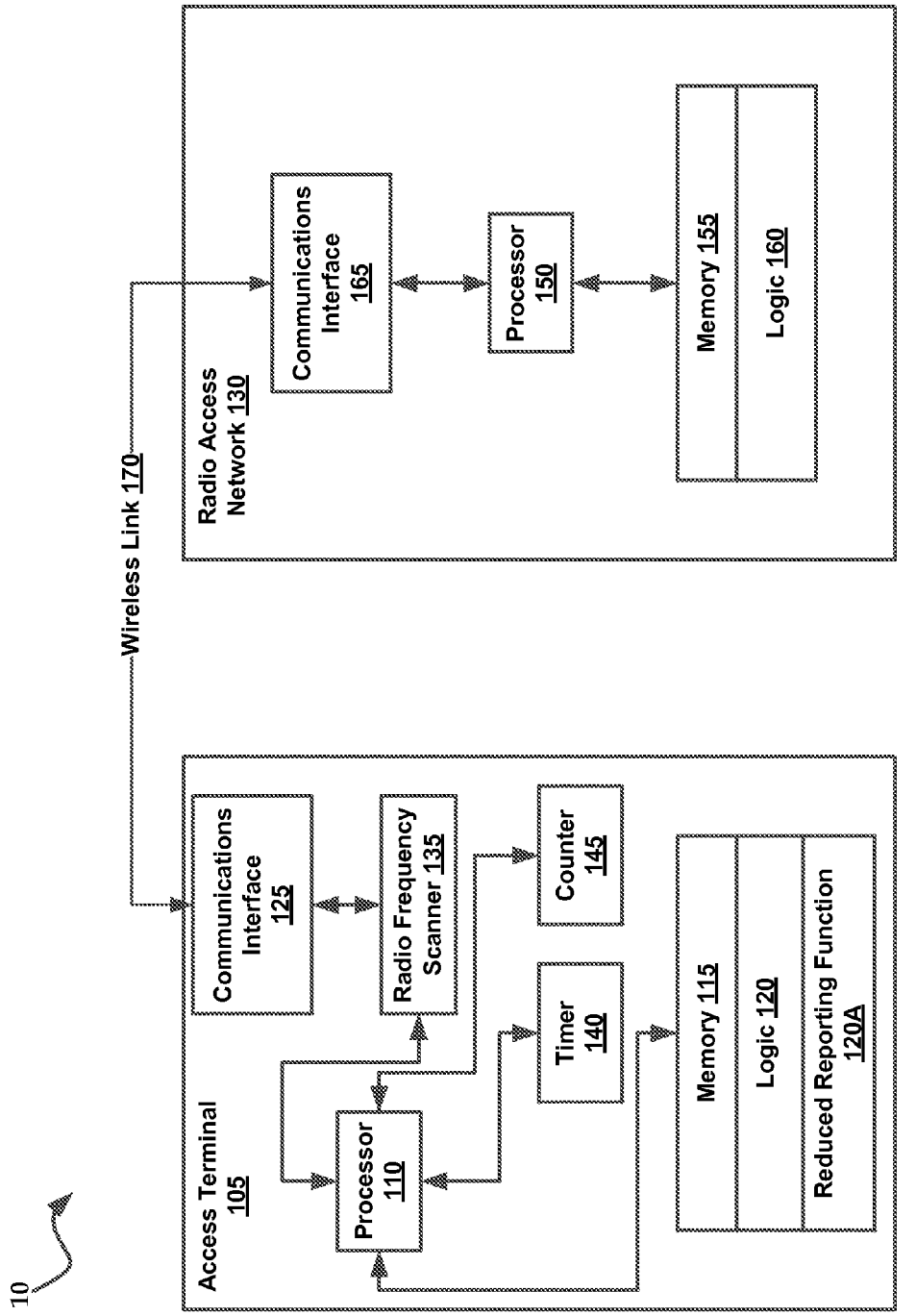
FIG. 1 is a schematic diagram of an exemplary wireless network that comprises an access terminal and a radio access network that are configured to implement embodiments of the present technology.

In the following description, for purposes of explanation, numerous specific details are set forth in order to provide a thorough understanding of the disclosure. It can be apparent, however, to one skilled in the art, that the disclosure may be practiced without these specific details. In other instances, structures and devices are shown at block diagram form only in order to avoid obscuring the disclosure.

As used herein, the term "route update messages" may mean either a message for a location update function (for example, a Route Update Message for a High Rate Packet Data (HRPD) network or a TAU message for LTE), or a message for a measurement report function (for example, a Route Update Message for HRPD or a Measurement Report for LTE). It should be noted that for HRPD, the Route Update Message is used for both location update and measurement report purposes.

For fixed location devices or very low mobility devices wireless devices, such as traffic light devices or smart utility devices, channel signal quality or pilot strength usually do not vary greatly. These types of devices do not need to report channel quality measurements back to an associated RAN as often as mobile devices. That is, it is common for the signal quality of a mobile device to change over time as the mobile device changes location. This variability is due to variations in network conditions local to the mobile device.

Generally, the present technology includes a method for reducing the number of measurement report messages that are required from fixed location devices, fixed location wireless modules, very low mobility devices or other similar devices that would be known to one of ordinary skill in the art. By reducing the reporting requirements of these devices a RAN can support a large number of such devices with minimum impact to the access channel resources. Indeed, when fixed location device (or very low mobility devices) are required to send route update messages with every access channel capsule transmitted to the RAN, such messages impose additional processing requirements on the RAN and may impact capacity and wireless network throughput, especially when large number of fixed devices in a certain area attempt to transmit data to the RAN simultaneously, or within a very short time period.

Advantageously, the present technology allows for the introduction of a parameter or other indication to designate if a device supports a reduced reporting function, also referred to as a measurement report reductions function (MRRF). If a device indicates that it supports or desires to utilize a reduced reporting function, there are a plurality of methods that can be utilized by a RAN to grant permission to the device that allows the device to utilize the reduced reporting function.

In some instances, the device, also referred to as an access terminal (AT) or user equipment (UE) transmits to the RAN a request that indicates that the AT supports or desires to utilize a reduced reporting function. In some instances, the request may be embodied in a capability message or during session negotiation with the RAN using one or more attributes.

When the RAN receives a request from the AT, the RAN can check a subscription profile of the AT to determine whether the AT is allowed to use the reduced reporting function. If allowed by the subscription profile, the RAN may transmit to the AT a response that grants permission to the AT to use reduced reporting function. If the AT is not allowed to use a reduced reporting function, the RAN may transmit to the AT a response that informs the AT that it cannot use the reduced reporting function. In some embodiments, the RAN may transmit the response through a forward link message, during session negotiation, or using any other message or methodology that would be known to one of ordinary skill in the art.

In other embodiments, the AT transmits to the RAN request that it desires to use a reduced reporting function. Rather than requiring the RAN to grant approval to the AT to use the reduced reporting function, the RAN grants permission automatically.

A reduced reporting function is a mechanism for reducing a first rate for route update messages transmitted by the AT to the RAN. In some embodiments, reducing the first rate at which the AT transmits route update messages to the RAN includes the AT transmitting route update messages to the RAN at a reduced rate that is lower than the first rate.

Thus if the AT is not allowed to use a reduced reporting function (or the reduced reporting function is not currently enabled), the AT will transmit route update messages to the RAN at the first rate. When the reduced reporting function is enabled on the AT, the AT will transmit route update messages to the RAN at a reduced rate that is lower than the first rate.

In some embodiments the reduced reporting function may include a timer parameter or a counter parameter. The timer parameter and the counter parameter define the reduced reporting rate for the AT.

A timer parameter specifies a time period for a timer that is maintained in the AT. At the expiration of the time period the AT transmits a route update message to the RAN. After the AT transmits the measurement report to the AN, the AT resets and restarts the timer. When the AT transmits route update messages to the RAN using the timer the AT effectively transmits route update messages to the RAN at a reduced rate that is lower than the first rate. For example, a first rate would include the AT transmitting route update messages with every message that is transmitted to the RAN. If the AT is configured to send messages every thirty seconds, the AT would be required to send a route update message every thirty seconds. When the reduced reporting function is enabled, the AT will only send a route update message every two hours, a time period which as defined in the time parameter.

Alternatively, a counter parameter specifies a number of transmissions counter value (Max_count value) for the AT. When the AT generates an access channel capsule transmission, the AT increases the counter value. The AT sends a measurement report when the counter reaches the Max_count value. After transmitting the measurement report the AT resets the report counter to zero. As with the timer parameter, when the AT transmits route update messages to the RAN using the timer the AT effectively transmits route update messages to the RAN at a reduced rate that is lower than the first rate. Again, a first rate of transmission may include the transmission of route update messages with every message transmitted to the RAN.

In some embodiments, irrespective of whether the AT has been given permission to use the reduced reporting function, as well as a current timer value or current counter value, if the RAN requests an AT to respond with a measurement report, the AT will be required to respond to the RAN with a route update message. The AT may be required to reset and restart the timer or counter, after transmission of the requested message.

It will be understood that the present technology can be used in any radio access technology that currently requires wireless devices to transmit measurement report in association with each access channel transmission. These and other advantages of the present technology will be described in greater detail with reference to the collective drawings.

FIG. 1 illustrates a wireless network 10 that operates accordance with an embodiment of the present invention. The network 10 includes an access terminal, AT 105 that communicates with a radio access network, RAN 130, over a wireless link 170. In general, the AT 105 may include a communications interface 125 that may comprise any component, or combination of components that allow the AT 105 to communicatively couple (e.g., facilitate data transfer) with other computing devices such as the RAN 130. The communications interface 125 may comprise a wireless module or adapter, or any other communications interface that would be known to one of ordinary skill in the art with the present disclosure before them.

As mentioned above, the AT 105 may include any fixed access device or low mobility device that would be known to one of ordinary skill in the art. In some embodiments, the access terminal 105 includes a processor 110 and a memory 115. The AT 105 also includes a radio frequency scanner 135, a timer 140, and a counter 145.

The processor 110 can be implemented as at least one microprocessor with one or more processing cores. Processor 110 can be implemented as a core processor that services one or more of the components of the AT 105. The memory 115 stores logic that is executed by the processor 110 to perform the various functions required of the access terminal. The functions required may be related to the operations of the AT 105. For example, an access terminal in the form of a smart sensor may include logic 120 that allows the smart sensor to conduct sensing operations, as well as other computing functions that allow the sensor to communicate with a centralized processing system.

In accordance with the present technology, the logic 120 also includes a reduced reporting function 120A or application that allows the AT 105 to send route update messages to the RAN 130 at a reduced rate. As mentioned above, the AT 105 may be configured to transmit route update messages to the RAN 130 at a first rate. The first rate may include the AT 105 transmitting a route update message with each message that the AT 105 transmits to the RAN 130.

Instead of transmitting route update messages using according to the first rate, the AT 105 may be allowed by the RAN 130 to use a reduced reporting function. The reduced reporting function allows the AT 105 to transmit route update messages to the RAN 130 at a reduced rate that is lower than the first rate, which results in a reduction of traffic on the wireless link 170 that would occur if the AT 105 transmitted route update messages at the first rate.

In some embodiments, the AT 105 may transmit to the RAN 130 a request to allow the access terminal 105 to use the reduced reporting function 120A. Again, this request may be presented in a capability message or during an initial session negotiation with the RAN 130. After the RAN 130 determines if the AT 105 is allowed to use the reduced reporting function, the AT 105 receives from the RAN 130 a response that grants permission to the AT 105 use the reduced reporting function 120A. It is noteworthy that in some instances, the RAN 130 may not allow the AT 105 to utilize the reduced reporting function 120A. For example, the RAN 130 may determine that the AT 105 is not properly configured to utilize the reduced reporting function 120A, or the AT 105 is in a local area that is known to the RAN 130 as having widely varying network conditions.

If the RAN 130 allows the AT 105 to use the reduced reporting function, the response received by the AT 105 from the RAN 130 may include parameters associated with the reduced reporting function 120A. As mentioned above, a parameter for the reduced reporting function may include a timer parameter or a counter parameter. Again, a timer parameter specifies a time period for the timer 140 that is maintained in the AT 105. At the expiration of the time period the AT 105 is required to transmit a route update message to the RAN 130. After the AT 105 transmits the route update message to the RAN 130, after expiration of the timer, the AT 105 resets and restarts the timer 140.

Alternatively, a counter parameter specifies a number of transmissions counter value (Max_count value) for the AT 105. When the AT 105 generates and transmits to the RAN 130 an access channel capsule (or other message), the AT 105 increases the counter value. The AT 105 sends a route update message to the RAN 130 when the counter reaches the Max_count value (e.g., counter value established by the RAN 130). After transmitting the route update message the AT 105 resets the report counter to zero. An exemplary reduced reporting function that utilizes a timer parameter is described in greater detail with regard to the signal flow diagram of FIG. 2, while an exemplary reduced reporting function that utilizes a counter parameter is described in greater detail with regard to the signal flow diagram of FIG. 3.

Once the reduced reporting function has been implemented by the AT 105, the AT 105 transmits messages to the RAN 130 on the wireless link 170 without a route update message. When required by a timer parameter or counter parameter, the AT 105 utilizes the radio frequency scanner 135 to scan access channels of the AT 105 to determine network conditions for the AT 105. The network conditions are used as the basis of a route update message that is transmitted to the RAN 130 in accordance with the reduced reporting function 120A.

In some embodiments, a change in network conditions at the AT 105 may prompt transmission of a route update message from the AT 105 to the RAN 130. Thus, the AT 105 may be configured to perform a network scanning process periodically using the radio frequency scanner 135. The AT 105 may detect a change in the network conditions local to the AT 105 by comparing the period scans of network conditions. The AT 105 is also configured to transmit a route update message to the RAN 130 even when a route update message is not required by either the timer parameter or the counter parameter, when a change in network conditions local to the AT 105 is detected.

In other embodiments, the AT 105 may transmit a route update message to the RAN 130 if requested by the RAN 130, even when a route update message is not required by the reduced reporting function.

According to some embodiments, the AT 105 may be configured to transmit to the RAN 130 a proposed time period for the timer parameter or a proposed counter value for the counter parameter. That is, rather than the RAN 130 supplying the AT 105 with the timer parameter or counter value, the AT 105 may propose to the RAN 130 proposed timer or counter values.

Thus, the AT 105 may receive from the RAN 130 a confirmation of the proposed time period or the proposed counter value. In other instances, the RAN 130 may transmit to the AT 105 an alternate time period or an alternate counter value that the AT 105 is required to implement.

According to some embodiments, the RAN 130 includes a communications interface 165 that may comprise any component, or combination of components that allow the RAN 130 to communicatively couple (e.g., facilitate data transfer) with other computing devices such as the AT 105. The communications interface 165 may comprise a wireless module or adapter, or any other interface that would be known to one of ordinary skill in the art with the present disclosure before them. The RAN 130 may also include a processor 150 and a memory 155 for storing logic 160. It will be understood that the processor 150 executes the logic 160 to perform any of the described reduced reporting related functionalities described herein. These functionalities include, but are not limited to determining if the AT 105 supports a reduced reporting function. In some instances, the RAN 130 may evaluate a subscription profile for the AT 105 that indicates that the AT 105 is capable of using the reduced reporting function. The RAN 130 may permit or deny the AT 105 access to use the reduced reporting function based upon the analysis of the subscription profile. By way of non-limiting example, the subscription profile may include an indication or explicit instructions that specify that the AT 105 is configured to utilize the reduced reporting function.

In other instances, the RAN 130 may determine if the AT 105 is a fixed or low mobility device by evaluating location information in the messages received from the AT 105. For example, if the location information in multiple messages from the AT 105 does not vary over time, or only varies slightly, the RAN 130 may determine that the AT 105 is fixed or reduced mobility device.

According to other embodiments, the RAN 130 may infer the fixed or reduced mobility nature of the AT 105 by comparing device information for the AT 105 to device information for similar ATs connected to the RAN 130. For example, the RAN 130 may determine that the AT 105 has a similar hardware configuration as other fixed access smart sensors that are connected to the RAN 130. Thus, the RAN 130 may infer that the AT 105 is also a fixed access smart sensor.

With regard to the establishment of timer parameters or counter values, the RAN 130 may be configured to establish a timer parameter by selecting a time period. Generally, the AT 105 is required to transmit a route update message at the end of the timer period. The time period chosen by the RAN 130 may be determined, at least in part, by the fixed or mobility attributes of the AT 105. For example, if the AT 105 is a fixed device, the time period may be set to a longer duration than a time period set for a low mobility device. In other instances, the time period may be related to the requirements of the system in which the AT 105 operates. For example, if the AT 105 is a smart sensor that is monitoring a high value object, the time period may be set to a shorter duration by the RAN 130 than a smart sensor associated with a monitored object that is less critical to the system.

In a similar manner, the RAN 130 may establish counter parameters by defining a counter value that specifies a number of messages that are to be sent by the AT 105 before having to transmit a route update message.

In one embodiment, the RAN 130 is associated with a 4GLTE (Long Term Evolution) wireless communications system. Rather than using a timer parameter or a counter parameter, the RAN 130 may be configured to setting a tracking area update (TAU) period for the AT 105 that includes an extended reporting period. The AT 105 utilizes the TAU with an extended reporting period to minimize the transmission of route update messages that are transmitted to the RAN 130 as compared with ATs that utilize a typical reporting period, such as ATs that do not support or are not authorized to utilize a reduced reporting function.

Figure 2:
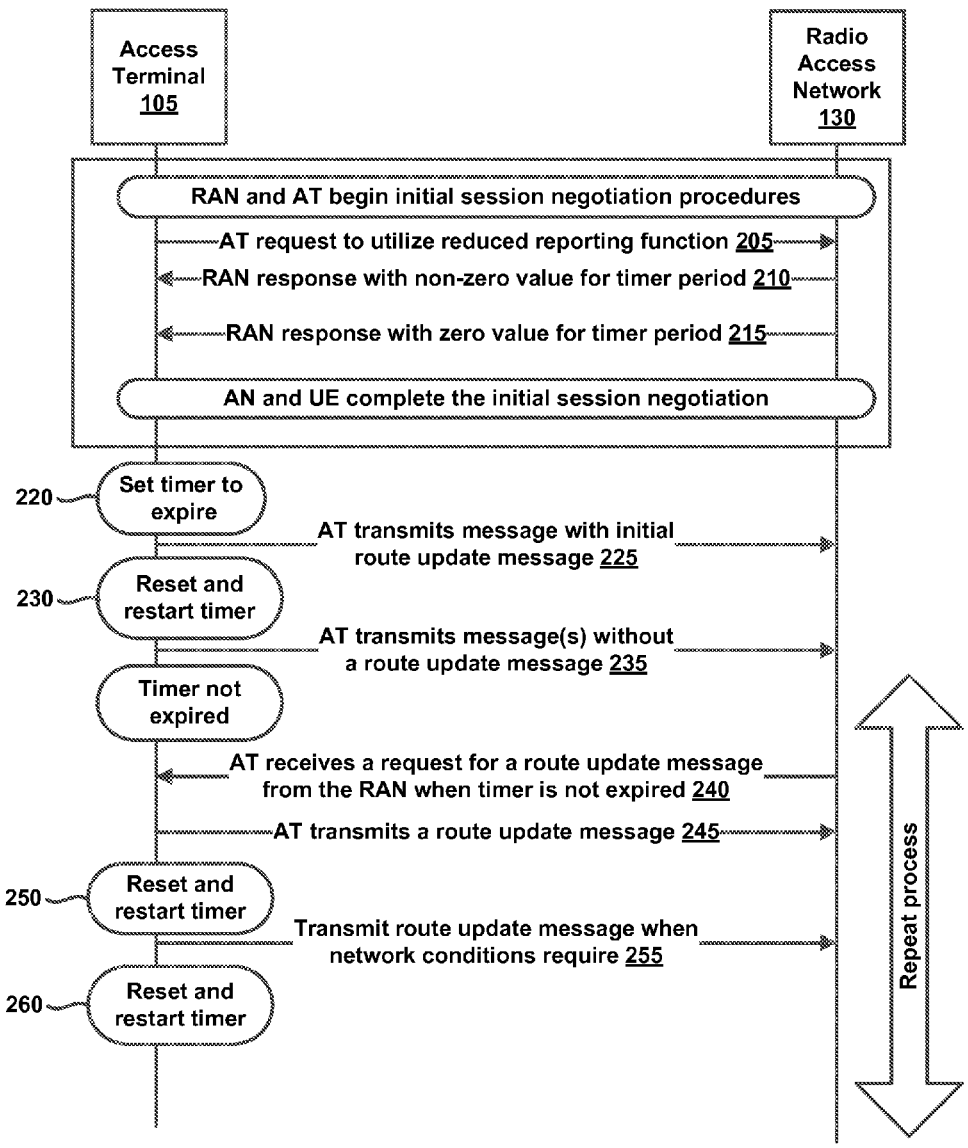
FIG. 2 is a signal flow diagram of a method for reducing the transmission of route update messages from an access terminal to a radio access network, the transmission of route update messages being governed by a timer.

FIG. 2 is a signal flow diagram that illustrates a process for minimizing the transmission of route update messages in a wireless network. More specifically, the process illustrated in FIG. 2 includes a timer-based reduced reporting approach that reduces the number of route update messages that are in a transmission from fixed location devices when transmitting access channel capsule.

Generally, while other devices may be present in a typical wireless network, FIG. 2 includes only a single AT 105 and a RAN 130 to illustrate the advantages of the present technology. Further, the wireless network of FIG. 2 includes an HRPD network. One of ordinary skill in the art will appreciate that the present technology may be applied to a wide variety of radio access technologies.

FIG. 2 includes an initial negotiations process that begins with the AT 105 transmitting a request 205 to utilize a reduced reporting function to the RAN 130. Again, this request may include the AT 105 providing an attribute/indication to the RAN 130 indicating the AT 105 desires to use a reduced reporting function.

In some embodiments, the AT 105 may also include proposed timer parameters that include a suggested route update message reporting interval (e.g., time period) for the AT 105 in idle state (e.g., fixed or low mobility).

After receiving the request 205 from the AT 105 the RAN 130 may determine if the AT 105 can support the requested reduced reporting function. In some embodiments, the RAN 130 evaluates a subscription profile for the AT 105 to determine if the AT 105 can support the reduced reporting function. During the session negotiation process, if the RAN 130 does not grant permission for the AT 105 to use the reduced reporting function, the RAN 130 can set the time period for the timer parameter to zero. The RAN 130 transmits to the AT 105 a response 210 that includes the zero value time period. Alternatively, if the RAN 130 grants permission to the AT 105 to use the reduced reporting function, the RAN 130 may generate a time period. The time period is included in a response 215 that is transmitted by the RAN 130 to the AT 105. More specifically, this time period is a non-zero value that defines a time period between the transmission of route update messages to the RAN 130.

After completion of session negotiation procedures, and if both the AT 105 and RAN 130 desire to enable the reduced reporting feature, the AT 105 sets a timer in the RAN 130 to an expired setting 220. When the AT 105 has data to send over an access channel on a wireless link 170 the AT 105 transmits a route update message 225 with an access channel capsule transmission. After the route update message is transmitted the AT 105 reset and restarts 230 the timer. The AT 105 does not include a route update message with any subsequent access channel capsule transmissions 235 until the timer is expired.

In some instances the RAN 130 may send a route update message request 240 the AT 105 to require the AT 105 to transmit a route update message. Whether the timer is expired or not, the AT 105 transmits 245 a route update message in response request from the RAN 130. After the route update message is sent, the AT 105 resets and restarts 250 the timer. The process essentially returns to the AT 105 transmitting route update messages only when the timer is expired.

In some embodiments, the AT 105 is monitoring the network conditions that are local to the AT 105. If the AT 105 determines that a change in network conditions requires transmission of a route update message to the RAN 130, the AT 105 may transmit a route update message 255 to the RAN 130, regardless of the current condition of the timer. As with the process for transmitting a requested route update message, the AT 105 may reset and restart 260 the timer after transmitting the route update message that was prompted by a change in network conditions.

Figure 3:
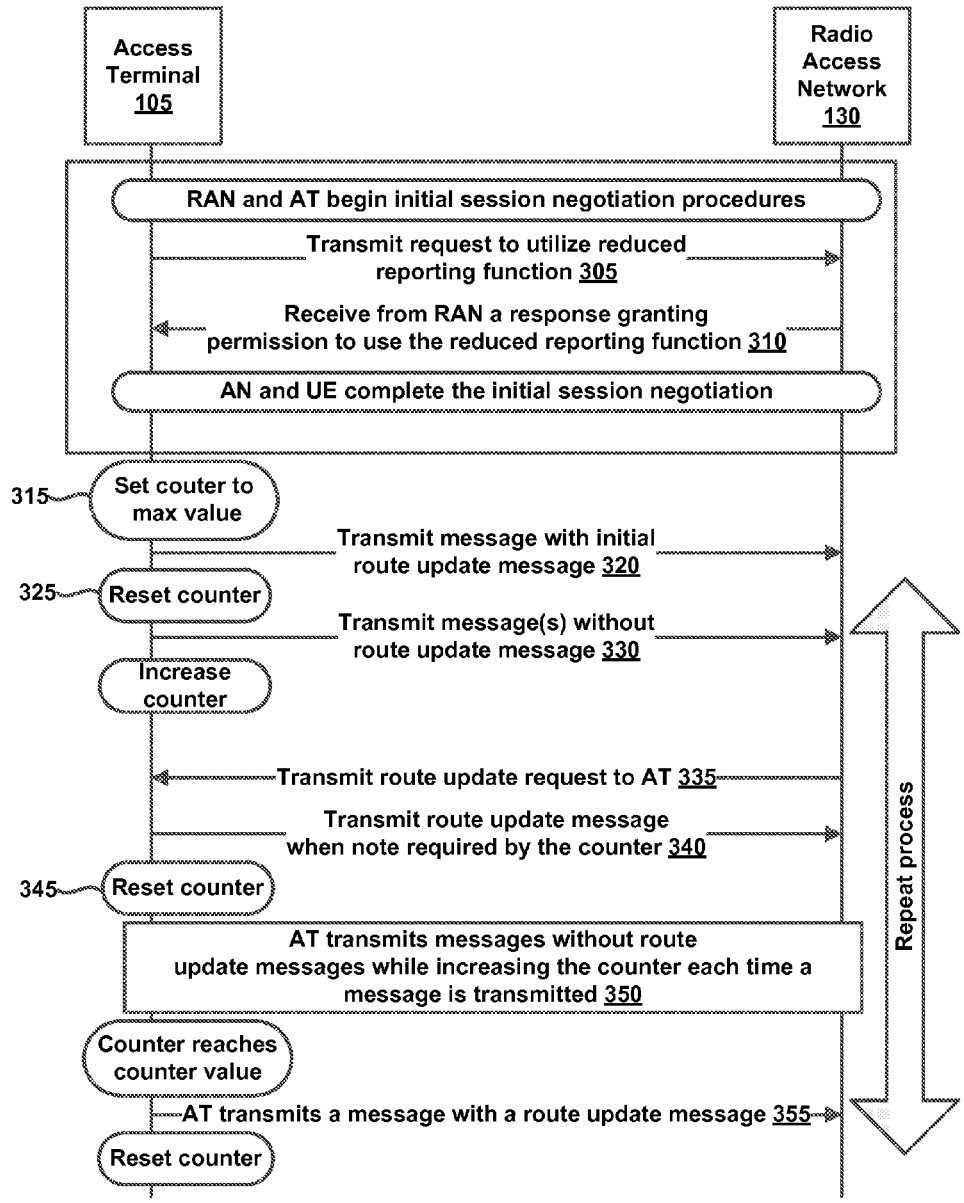
FIG. 3 is a signal flow diagram of a method for reducing the transmission of route update messages from an access terminal to a radio access network, the transmission of route update messages being governed by a counter.

FIG. 3 is a signal flow diagram that illustrates a process for minimizing the transmission of route update messages in a wireless network. More specifically, the process illustrated in FIG. 3 includes a counter-based reduced reporting approach that reduces the number of route update messages that are transmission from fixed location devices when transmitting access channel capsule.

During session establishment between the AT 105 and the RAN 130, the AT 105 transmits a request 305 to the RAN 130 indicating the AT 105 desires to use a reduced reporting function.

In some embodiments, the AT 105 may include a proposed counter parameter that specifies defines a counter value that defines a number of messages that are to be sent by the AT 105 before having to transmit a route update message to the RAN 130. The RAN 130 may adopt this proposed counter value or may alternatively select another counter value instead.

After receiving the request from the AT 105, the RAN 130 evaluates a subscription profile for the 105A and determines if the AT 105 can support the reduced reporting function. During the session negotiation process, the RAN 120 transmits a response 310 to the AT 105 that grants permission to use reduced reporting function. This response also includes a counter value that the AT 130 implements.

If the RAN 130 does not allow the AT 105 to use reduced reporting function the RAN 130 can set the counter value to zero.

After completion of session negotiation procedures and if both the AT 105 and RAN 130 agree to enable the reduced reporting function, the AT 105 sets 315 the counter value of a counter to the counter value (e.g., Max counter value) established by the RAN 130. This process requires the AT 105 to transmit an initial route update message 320 with the first message that it transmits to the RAN 130. After the initial route update message is transmitted the AT 105 resets 325 the counter to a zero value.

For every access channel capsule transmission, such as transmission 330, if the current counter value is not equal to the established counter value, the AT 105 does not include with the transmission a route update message. In these instances the AT 105 will increase current counter value by one, for each messages with no route update message.

If the RAN 130 transmits a route update request message 335 to the AT 105, regardless of the current counter value, the AT 105 will then transmit a route update message 340 in response to the request from the RAN 130. After route update message is sent, the AT 105 resets 345 the counter to zero. Again, the AT 105 may continue to transmit messages 350 to the RAN 130 without a route update message, each time increasing the current counter value by one. When the current counter value reaches the counter value established by the RAN 130, the AT 105 transmits its next message 355 with a route update message.

Figure 4:
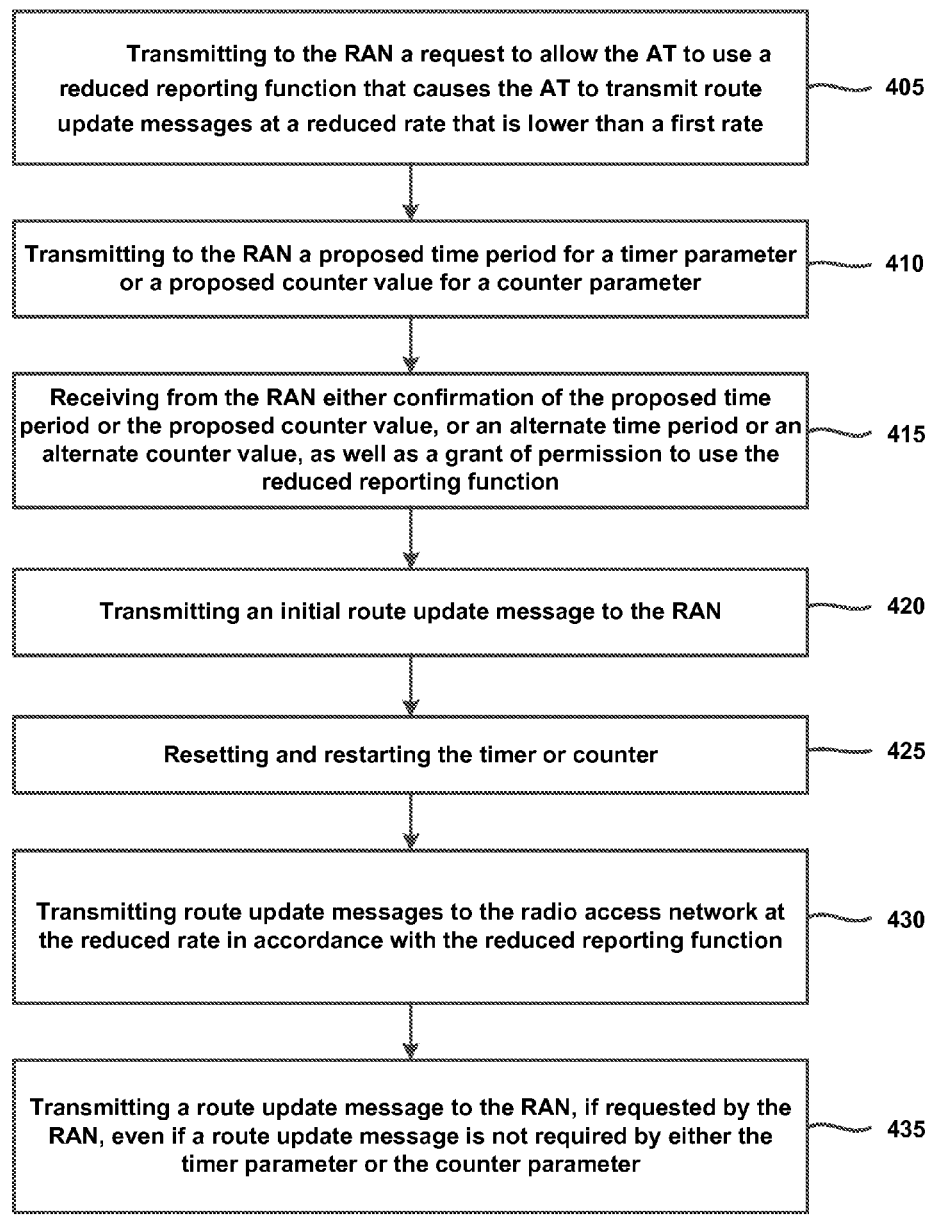
FIG. 4 is a flowchart of a method for reducing the transmission of route update messages from an access terminal to a radio access network, the method being executed in an access terminal.

FIG. 4 illustrates an exemplary method that is executed by an access terminal (AT), such as cellular telephone, a smart sensor, or other wireless device. The access terminal includes a processor and a memory for storing logic. The logic includes a reduced reporting function that when executed by the processor causes the AT to perform the method for reducing a first rate at which the AT transmits route update messages to a RAN. In some embodiments, the method includes the AT 105 transmitting 405 to the RAN 130 a request to allow the AT 105 to use a reduced reporting function that causes the AT 105 to transmit route update messages at a reduced rate that is lower than the first rate.

As mentioned above, the reduced reporting function may include either a timer parameter or a counter parameter, each of which define the reduced rate. For example, a timer parameter may include a time period that specifies when the AT 105 is required to transmit a route update message to the RAN 130. That is, the AT 105 manages a timer that counts up or down, the time period of the timer parameter. When the timer expires the AT 105 is required to transmit a route update message to the RAN 130 with its next message. By way of example, when the AT 105 transmits route update messages to the RAN 130 at the first rate the AT 105 may transmit 60 route update messages per hour. When the reduced reporting function is enabled on the AT 105, the timer parameter may specify that the AT 105 should send only a single route update message every hour. Thus, the AT 105 transmits the route update message at a reduced rate in accordance with the reduced reporting function.

The counter parameter may also be used to instantiate a reduced rate in the AT 105. Rather than specifying a time that is counted by a timer, the counter parameter specifies a counter value that defines a number of intervening messages that the AT 105 can transmit to the RAN 130 that do not include a route update message. For example, the counter value may be set to 20 such that the AT 105 only transmits a route update message to the RAN 130 on the twenty first message. When the twenty first message is sent the AT 105 resets and restarts the counter.

In some embodiments, the method may include the AT 105 transmitting 410 to the RAN 130 a proposed time period for the timer parameter or a proposed counter value for the counter parameter. The method includes the AT 105 receiving 415 from the RAN 130 either confirmation of the proposed time period or the proposed counter value, or an alternate time period or an alternate counter value.

It will be understood that in some embodiments, the RAN 130 automatically provides a timer parameter or counter parameter to the AT 105 in the response that is received by the AT 105 in step 415. The response received by the AT 105 in step 415 also grants permission to the AT 105 to use the reduced reporting function.

The method includes the AT 105 transmitting 420 an initial route update message to the RAN 130, along with the first message that is transmitted by the AT 105 to the RAN 130 after the AT 104 is approved to utilize the reduced reporting function.

Depending on whether the AT 105 has been required by the RAN 130 to utilize a timer or a counter, the method includes the AT 105 resetting and restarting the timer or counter. Subsequently, the method includes the AT 105 transmitting 430 route update messages to the RAN 130 a reduced rate that is lower than the first rate. Again, this reduced rate is defined by the timer parameter or the counter parameter.

In some embodiments, the method includes the AT 105 transmitting 435 a route update message to the RAN 130, if requested by the RAN 103, even when a route update message is not required by either the timer parameter or the counter parameter. That is the RAN 130 can selectively override the reduced reporting functionality executed by the AT 105 at any time, requiring the AT 105 to transmit a route update message. For example, if the RAN 130 determines that other ATs in the same area as the AT 105 are experiencing degradation in network conditions, the RAN 130 may require ATs in the local area to transmit a route update message. As mentioned above, the route update message may include a scan of the local RF conditions proximate the AT 105.

Figure 5:
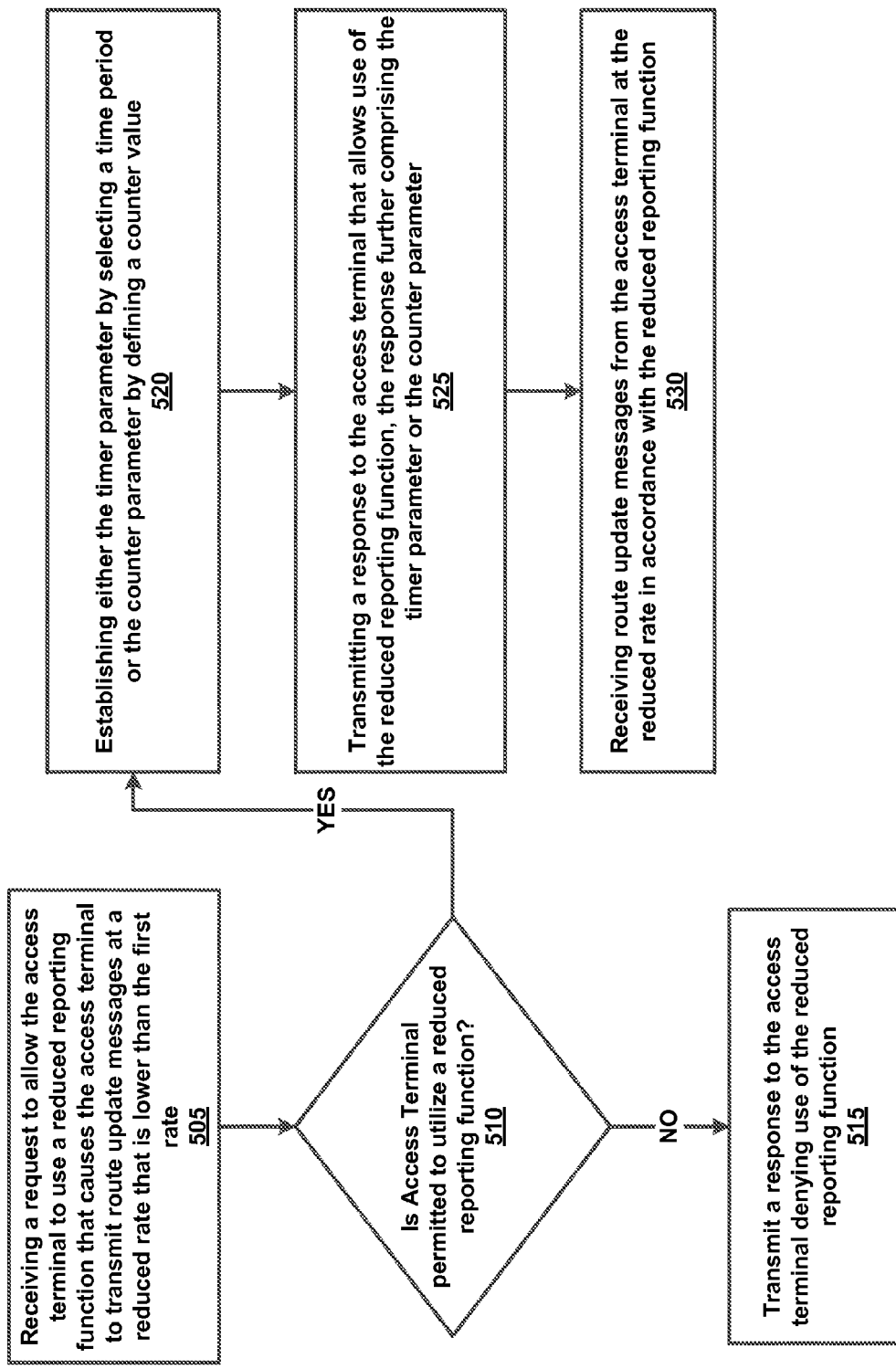
FIG. 5 is a flowchart of a method for reducing the transmission of route update messages from an access terminal to a radio access network, the method being executed in a radio access network.

FIG. 5 illustrates an exemplary method for reducing a first rate at which route update messages are transmitted by an AT 105 to a RAN. The method may be executed by a radio access network (RAN) that couples with various wireless devices. The RAN includes a processor and a memory for storing logic. The logic when executed by the processor causes the RAN to perform the method. In some embodiments, the method includes the RAN 130 receiving 505 a request to allow the access terminal 105 to use a reduced reporting function that causes the access terminal 105 to transmit route update messages at a reduced rate that is lower than the first rate.

In some embodiments the method includes the RAN 130 determining 510 if the AT 105 supports a reduced reporting function. If the RAN 130 determines that the AT 105 is not allowed to utilize the reduced reporting function, the method includes the RAN 130 transmitting to the AT 105 a response denying the use of the reduced reporting function. Conversely, if the RAN 130 determines that the AT 105 is allowed to utilize the reduced reporting function, the method may include the RAN 130 establishing 520 either a timer parameter by selecting a time period or a counter parameter by defining a counter value.

The method also includes the RAN 130 transmitting 525 a response to the AT 105 that grants permission to use the reduced reporting function by the AT 105. It is noteworthy that the response further comprises the timer parameter or the counter parameter established by the RAN 130 in step 520. Again, the reduced rate may be defined by either the timer parameter or the counter parameter.

According to some embodiments, the method includes the RAN 130 receiving 530 route update messages from the AT 105 at the reduced rate in accordance with the reduced reporting function.

For some radio access technologies, the AT 105 may be configured to transmit to the RAN 130 an indication that the AT 105 has fixed device characteristics. When the RAN 130 receives this indication from the AT 105 the RAN 130 can execute the aforementioned process to allow the AT 105 to use the reduced reporting function.

In some embodiments, the RAN 130 may be implemented in a wireless network that utilizes a radio access technology, such as LTE (Long Term Evolution). In LTE networks a Tracking Area Update (TAU) procedure may be utilized if the network knows the AT 105 is a fixed device. The RAN 130 is configured to ascertain if the access terminal (105) is a fixed access or reduced mobility device.

The RAN 130 is also configured to set a periodic TAU reporting that includes an extended reporting period. The RAN 130 may also configure different measurable trigger parameters (for example, a signal strength trigger level lower than the normal level). The extended periodic TAU and/or the lower trigger parameters level may allow the device to reduce the number of update messages (e.g., TAU messages or Measurement report messages) sent to the RAN 130. If the network conditions local to the AT 105 meet or exceed an establish network conditions threshold, the AT 105 is not required to transmit route update messages to the RAN 130. Conversely, if the network conditions local to the AT 105 fall below the threshold, the AT 105 will begin to transmit route update messages with each subsequent message that is transmitted to the RAN 130. It is noteworthy that the RAN 130 may select to use either the tracking update period or the trigger parameters.

It is noteworthy to mention that in some embodiments the RAN 130 can turn off periodic reporting for a fixed device AT.

Figure 6:
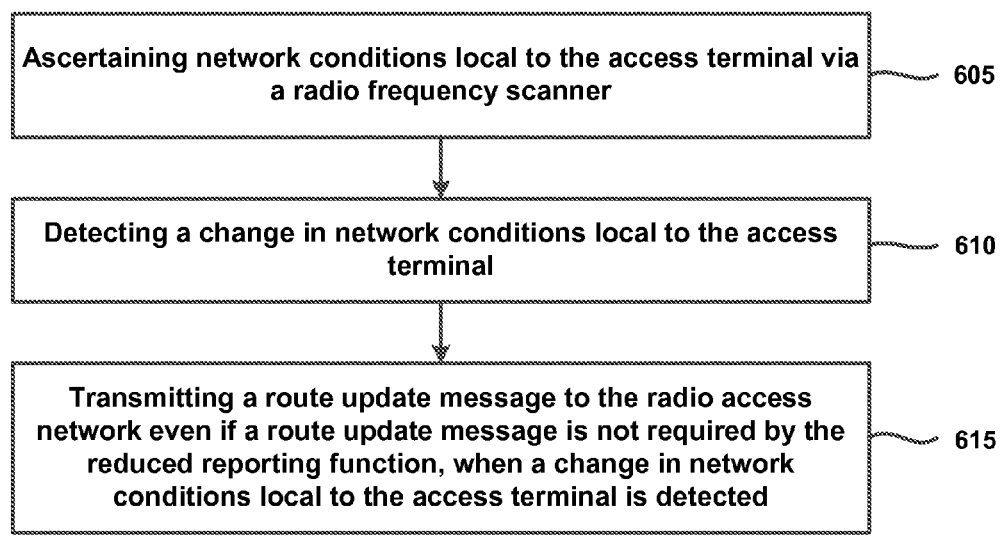
FIG. 6 is a flowchart of a method for transmitting route update messages from an access terminal to a radio access network, necessitated by a change in network conditions at the access terminal.

FIG. 6 illustrates an exemplary method that is executed by an access terminal. This method describes a process that is executed by the AT 105 to transmit route update messages to the RAN 130, even when the AT 105 is not required to transmit such a message due to the expiration of a timer or a current counter value meeting an established counter value. In this method, the AT 105 will transmit a route update message to the RAN 130 when a change in network conditions local to the AT 105 occurs. Again, the route update message is sent even when the AT 105 has been granted permission to use a reduced reporting function.

In some embodiments, the method includes the AT 105 ascertaining 605 network conditions local to the AT 105 via a radio frequency scanner 135. Also, the method includes the AT 130 detecting 610 a change in network conditions local to the AT 105 is detected. As mentioned above, the detection of a change in network conditions may include the comparison of a plurality of local RF scans over a period of time. The method may also include the AT 105 transmitting 615 a route update message to the RAN 130 even when a route update message is not required by either the timer parameter or the counter parameter, when a change in network conditions local to the AT 105 is detected.

It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the computing device, partly on the computing device, as a stand-alone software package, partly on the computing device and partly on a remote computer or entirely on the remote computer or server. In the latter scenario, the remote computer may be coupled with the computing device through any type of network, including a local area network (LAN) or a wide area network (WAN), or the connection may be made to an external computer (for example, through the Internet using an Internet Service Provider).

Embodiments of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method, in an access terminal, for reducing a first rate at which the access terminal transmits route update messages to a radio access network over a wireless link, the access terminal comprising a processor and a memory for storing logic, the logic being executed by the processor to perform the method, comprising:

transmitting to the radio access network a request to allow the access terminal to use a reduced reporting function that causes the access terminal to transmit route update messages at a reduced rate that is lower than the first rate;

receiving from the radio access network a response that denies use of the reduced reporting function when the radio access network determines, by evaluating a subscription profile for the access terminal, that the access terminal is not allowed to utilize the reduced reporting function;

receiving from the radio access network a response that grants permission to use the reduced reporting function by the access terminal when the radio access network determines, by evaluating the subscription profile for the access terminal, that the access terminal is allowed to utilize the reduced reporting function; and transmitting route update messages to the radio access network at the reduced rate in accordance with the reduced reporting function when permission to use the reduced reporting function is granted.

2. The method according to claim 1, wherein the reduced reporting function comprises a timer parameter or a counter parameter, either of which defines the reduced rate at which the access terminal transmits route update messages.

3. The method according to claim 2, wherein when the reduced reporting function includes the timer parameter, the method further comprises:

transmitting an initial route update message to the radio access network; and resetting a timer within the access terminal, wherein the timer counts a time period that is specified in the timer parameter.

4. The method according to claim 2, wherein when the reduced reporting function includes the counter parameter, the method further comprises:

transmitting an initial route update message to the radio access network; and resetting a counter within the access terminal, wherein the counter includes a counter value as specified in the counter parameter.

5. The method according to claim 2, further comprising:

transmitting to the radio access network a proposed time period for the timer parameter or a proposed counter value for the counter parameter; and receiving from the radio access network either:
confirmation of the proposed time period or the proposed counter value, or
an alternate time period or an alternate counter value.

6. The method according to claim 1, further comprising transmitting a route update message to the radio access network, when requested by the radio access network, even when a route update message is not required by the reduced reporting function.

7. The method according to claim 1, further comprising:

ascertaining network conditions local to the access terminal via a radio frequency scanner;

detecting a change in the network conditions local to the access terminal; and transmitting a route update message to the radio access network even when a route update message is not required by reduced reporting function, when a change in network conditions local to the access terminal is detected.

8. A method, in a radio access network, for reducing a first rate at which the access terminal transmits route update messages to the radio access network over a wireless link, the radio access network comprising a processor and a memory for storing logic, the logic being executed by the processor to perform the method, comprising:

receiving a request to allow the access terminal to use a reduced reporting function that causes the access terminal to transmit route update messages at a reduced rate that is lower than the first rate;

determining whether the access terminal is allowed to utilize the reduced reporting function by evaluating a subscription profile for the access terminal;

transmitting a response to the access terminal denying use of the reduced reporting function when the radio access network determines that the access terminal is not allowed to utilize the reduced reporting function;

transmitting a response that grants permission to use the reduced reporting function by the access terminal when it is determined that the access terminal is allowed to utilize the reduced reporting function; and receiving route update messages from the access terminal at the reduced rate in accordance with the reduced reporting function when permission to use the reduced reporting function is granted.

9. The method according to claim 8, further comprising establishing a timer parameter of the reduced reporting function by selecting a time period between transmission of route update messages by the access terminal.

10. The method according to claim 8, further comprising establishing a counter parameter of the reduced reporting function by defining a counter value that specifies a number of messages that are to be sent by the access terminal before having to transmit a route update message.

11. An access terminal configured to transmit route update messages to a radio access network at a first rate and also at a reduced rate that is lower than the first rate, the access terminal comprising:

a processor; and a memory for storing logic that includes a reduced reporting function, wherein the processor executes the logic to cause the access terminal to:

transmit to the radio access network, a request to allow the access terminal to use a reduced reporting function that causes the access terminal to transmit route update messages at the reduced rate;

receive from the radio access network a response that denies use of the reduced reporting function when the radio access network determines, by evaluating a subscription profile for the access terminal, that the access terminal is not allowed to utilize the reduced reporting function;

receive from the radio access network, a response that grants permission to use the reduced reporting function by the access terminal when the radio access network determines, by evaluating the subscription profile for the access terminal, that the access terminal is allowed to utilize the reduced reporting function; and transmit route update messages to the radio access network at the reduced rate in accordance with the reduced reporting function when permission to use the reduced reporting function is granted.

12. The access terminal according to claim 11, wherein the reduced reporting function comprises a timer parameter or a counter parameter, either of which defines the reduced rate.

13. The access terminal according to claim 11, wherein the processor further executes the logic to cause the access terminal to:
- receive the timer parameter from the radio access network, wherein the timer parameter includes a time period that is counted by a timer;
- set a timer according to the time period;
- transmit an initial route update message to the radio access network; and
- reset the timer after the initial route update message is transmitted.

14. The access terminal according to claim 11, wherein the processor further executes the logic to cause the access terminal to:
- set a counter of the counter parameter equal to a maximum counter value;
- transmit an initial route update message to the radio access network; and
- reset the counter within the access terminal, wherein the counter includes a counter value that is counted by a counter of the access terminal.

15. The access terminal according to claim 11, wherein the processor further executes the logic to cause the access terminal to:
- determine network conditions local to the access terminal via a radio frequency scanner;
- detect a change in the network conditions local to the access terminal; and
- transmit a route update message to the radio access network even when a route update message is not required by the reduced reporting function.

16. The access terminal according to claim 11, wherein the processor further executes the logic to cause the access terminal to transmit to the radio access network a message that indicates that the access terminal is a fixed access or reduced mobility device.

17. A radio access network configured to receive route update messages from an access terminal at a first rate and also at a reduced rate that is lower than the first rate, the radio access network comprising:
- a processor; and
- a memory for storing logic, wherein the processor executes the logic to cause the radio access network to:
  - determine if the access terminal coupled with the radio access network supports a reduced reporting function by evaluating a subscription profile for the access terminal;
  - transmit a response to the access terminal denying use of the reduced reporting function when the radio access network determines that the access terminal is not allowed to utilize the reduced reporting function
  - transmit a response that grants permission to use the reduced reporting function by the access terminal when it is determined that the access terminal is allowed to utilize the reduced reporting function; and
  - receive route update messages from the access terminal at the reduced rate in accordance with the reduced reporting function when permission to use the reduced reporting function is granted.

18. The radio access network according to claim 17, wherein the radio access network determines whether an access terminal should utilize the reduced reporting function by determining whether the access terminal is a fixed access or reduced mobility device.

19. The radio access network according to claim 18, wherein the processor executes the logic to cause the radio access network to set a tracking area update (TAU) period for the access terminal that includes an extended reporting period, wherein the tracking area update (TAU) period is the reduced reporting function.

20. The radio access network according to claim 18, wherein the processor executes the logic to cause the radio access network to set a lower signal strength trigger level that is lower than a normal level for the access terminal, wherein the lower signal strength trigger level causes the access terminal to reduce the number of measurement report messages the terminal transmits to the radio access network.

21. The radio access network according to claim 17, wherein the processor executes the logic to cause the radio access network to establish a timer parameter that comprises a time period that is utilized by a timer of the access terminal to cause the access terminal to transmit route update messages at the reduced rate.

22. The radio access network according to claim 17, wherein the processor executes the logic to cause the radio access network to establish a counter parameter that comprises a counter value that is utilized by a counter of the access terminal to cause the access terminal to transmit route update messages at the reduced rate.

* * * * *

UNITED STATES PATENT AND TRADEMARK OFFICE
CERTIFICATE OF CORRECTION

PATENT NO.        : 9,338,682 B2
APPLICATION NO.   : 14/031329
DATED             : May 10, 2016
INVENTOR(S)       : Cherian et al.

It is certified that error appears in the above-identified patent and that said Letters Patent is hereby corrected as shown below:

In the Drawings:

In Fig. 3, Sheet 3 of 5, for Tag "340", in Line 2, delete "note" and insert -- not --, therefor.

In the Specification:

In Column 5, Line 56, delete "AN," and insert -- RAN, --, therefor.

Signed and Sealed this
Second Day of August, 2016

Michelle K. Lee
*Director of the United States Patent and Trademark Office*